US005097277A

United States Patent [19]

Schmidlin et al.

[11] Patent Number: 5,097,277

[45] Date of Patent: Mar. 17, 1992

[54] CYCLONIC TONER CHARGING DONOR

[75] Inventors: Fred W. Schmidlin, Pittsford; Robert G. Martin, Rochester, both of N.Y.

[73] Assignee: Xerox Corporation, Stamford, Conn.

[21] Appl. No.: 548,459

[22] Filed: Jul. 2, 1990

[51] Int. Cl.[5] ........................ G01D 15/06; G03G 15/08

[52] U.S. Cl. ........................................ 346/155; 355/247

[58] Field of Search ............................ 346/153.1-155; 355/247-249, 255

[56] References Cited

U.S. PATENT DOCUMENTS

| | | | |
|---|---|---|---|
| 3,689,935 | 9/1972 | Pressman et al. | 346/74 ES |
| 3,791,730 | 2/1974 | Sullivan, Jr. | 355/247 |
| 4,162,842 | 7/1979 | Wu | 355/247 |
| 4,491,855 | 1/1985 | Fujii et al. | 346/159 |
| 4,527,884 | 7/1985 | Nusser | 355/247 |
| 4,568,955 | 2/1986 | Hosoya et al. | 346/153.1 |
| 4,743,926 | 5/1988 | Schmidlin et al. | 346/159 |
| 4,814,796 | 3/1989 | Schmidlin | 346/155 |
| 4,876,561 | 10/1989 | Schmidlin | 346/159 |
| 4,903,049 | 2/1990 | Sotack | 346/159 |
| 4,903,050 | 2/1990 | Schmidlin | 346/160.1 |
| 4,994,859 | 2/1991 | Mizuno et al. | 355/247 |

*Primary Examiner*—George H. Miller, Jr.

[57] ABSTRACT

Direct Electrostatic Printer including a combination toner charging and delivery system. The combination toner charging and delivery system serves to convey well charged toner to an area adjacent an apertured printhead through which toner particles are propelled in image configuration. The system is provided with an annular channel in a generally cylindrical member through which toner laden air moves under pressure. During movement uncharged toner particles collide with a triboactive surface of the channel due to centrifugal force and become charged. The other surface delineating the channel carries a bias electrode thereon. The electrostatic field created by the bias prevents toner from colliding with the triboactive surface once it has reached a predetermined charge/mass ratio.

20 Claims, 1 Drawing Sheet

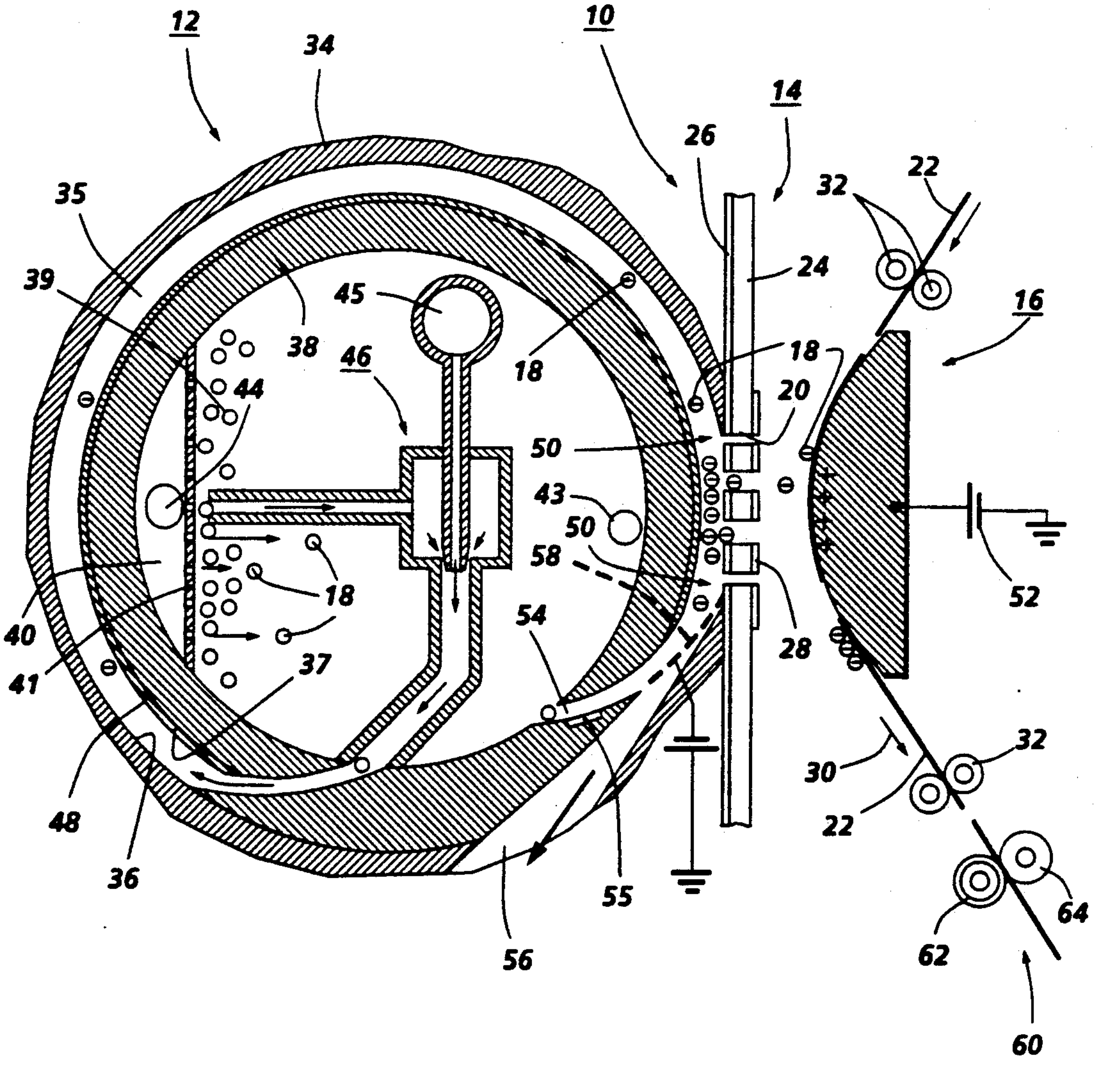
12
34
10
14
26
22
32
35
24
39
45
16
38
46
18
18
44
20
50
43
50
52
58
18
54
28
40
37
41
32
30
48
22
36
55
64
56
62
60

CYCLONIC TONER CHARGING DONOR

BACKGROUND OF THE INVENTION

This invention relates to a Direct Electrostatic Printer (DEP) device and more particularly to a toner delivery system for presenting charged toner to an electronically addressable printhead utilized for depositing toner in image configuration on plain paper.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of one-component insulative magnetic toner and to record a visible image by the charged particles directly on an image receiving member. Fuji, et al. show an apertured printhead structure having wedge-shaped apertures wherein the larger diameter of an aperture is delineated by a signal or control electrode and is disposed opposite an image receiving substrate.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

U.S. Pat. No. 4,814,796 granted to Fred W. Schmidlin on Mar. 21, 1989 describes a DEP apparatus including a structure for delivering developer or toner to an apertured printhead structure. The toner delivery system of this patent delivers toner containing a minimum quantity of wrong sign and size toner. To this end, the developer delivery system includes a conventional magnetic brush which delivers toner to a donor roll member which, in turn, delivers toner to the vicinity of the apertures in the printhead structure.

U.S. Pat. No. 4,743,926 granted to Schmidlin et al on May 10, 1988 describes a developer or toner delivery system adapted to deliver toner containing a minimum quantity of wrong sign and size toner. To this end, the delivery system includes a pair of charged toner conveyors which are supported in face-to-face relation. An electrical bias is applied across the two conveyors to cause toner of one polarity and size to be attracted to one of the conveyors while toner of the opposite polarity is attracted to the other of the two conveyors. Only toner from one of the conveyors is delivered to an apertured printhead forming a part of a DEP apparatus.

U.S. Pat. No. 4,876,561 granted to Fred W. Schmidlin on Oct. 24, 1989 describes a DEP device which is optimized by presenting well charged toner to a charged toner conveyor which conveys the toner to an apertured printhead. The charged toner conveyor comprises a plurality of electrodes wherein the electrode density (i.e. over 400 electrodes per inch) is relatively large for enabling a high toner delivery rate without air breakdown. To this end, the thickness of the printhead structure is about 0.025 mm and the aperture diameter (i.e. 0.15 mm) is large compared to the printhead thickness.

U.S. Pat. No. 4,903,049 decribes Direct Electrostatic Printing which is enhanced by the provision of wrong sign toner extraction holes in a printhead structure at a location which is upsteam of the printing apertures. Wrong sign toner particles are extracted from a cloud of toner provided from a toner delivery device. The wrong sign toner is extracted from the powder cloud before the cloud reaches the vicinity of the printing apertures thereby minimizing print hole blockage.

U.S. Pat. No. 4,903,050 describes Direct Electrostatic Printing which is enhanced by the provision of a shutter mechanism for preventing toner dislodged from the backside of a printhead structure from being deposited on image receiving substrates. The shutter is interposed between the printhead structure and the image receiving substrate during a cleaning cycle. The dislodged toner is removed from the between the printhead structure and the image receiving substrate with a combination vacuum and toner collection device.

The use of an airborne toner source that is capable of delivering toner into proximity with the apertures in an apertured printhead structure of a DEP apparatus is essential to enable extended printing without the ruse of periodic cleaning of the printhead structure. Also, it is desirable that the toner source be simple, low cost, reliable and have an extended operating life. Further, toner charged to a specific level of charge/mass is especially desired for DEP because it controls the passage of toner through the holes in the apertured printhead.

BRIEF SUMMARY OF THE INVENTION

The features noted hereinabove as being either desirable or essential are provided in the present invention to be described hereinafter. To this end there is provided a combination toner charging and delivery apparatus capable of charging toner in the range of 3 to 30 microcoulombs/gram and delivering the toner in a cloud to the apertured printhead structure.

A cylindrically shaped apparatus is provided with a circular channel delineated by an outer surface which is triboactive with the toner particles. The channel is further delineated by an inner surface which is electrically biased to a predetermined voltage relative to the outer surface. Toner laden air is introduced into the apparatus through one end thereof. The toner is carried by the air through the channel, the toner being introduced into the channel at a channel entrance. The toner is forced to charge to its natural polarity by being driven against the triboactive outer surface by centrifugal force. The charging action continues until the electrostatic force created by the voltage applied across the channel is greater than the centrifugal forces acting on the toner thereby causing the toner to move away from the outer surface. The level of q/m (charge/mass) attained by the toner is determined by the air velocity, the channel curvature (radius R) and the electric field (E) in the channel. The q/m must satisfy the equation $q/m=(V^2/E)/R$. It should be noted that the typically desirable level of 10 microcoulombs/gm can be easily reached with air moving at 10 meters/sec.in a field of one volt/micron in a channel with a one cm radius of curvature. It is noted that this apparatus has the desired property of charging all toner to exactly the same value of q/m. In any specific device the level of q/m is selectable by adjustment of V and/or E.

A cloud of well charged toner is conveyed to an outlet from the the cylindrical member. The outlet is positioned adjacent an apertured printhead structure through which toner particles are propelled in image configuration. The toner images are projected onto a image receiving substrate positioned on the other side of the printhead from the combination toner charging and delivery system.

An air exit from the channel which is located downstream from the aforementioned outlet contains a screen for separating the unused toner from the air stream, allowing the toner to be returned to a toner supply. A scorotron serves to neutralize the unused toner particles prior to their return te the supply.

DESCRIPTION OF THE DRAWINGS

The FIGURE is a schematic illustration of a printing apparatus incorporating the present invention.

DETAILED DESCRIPTION OF THE PREFERRED EMBODIMENT OF THE INVENTION

Disclosed in the Figure is a schematic illustration of a direct electrostatic printing apparatus 10 incorporating the invention.

The printing apparatus 10 comprises a combination toner charging and delivery system generally indicated by the reference character 12, an aperture printhead structure 14 and a substrate shoe or backing electrode 16. The combination toner charging and delivery system serves to deliver charged toner particles 18 to the proximity of a plurality of apertures 20 contained in the apertured printhead structure 14. The toner particles are moved through the apertures in image configuration and deposited on recording medium or image receiving substrates 22.

The toner particles may comprise any conventional xerographic toner which is mixed with Aerosil (Trademark of Degussa, Inc.) in an amount equal to ½% by weight.

The printhead structure 14 comprises a layered member including an electrically insulative base member 24 fabricated from a polyimide film approximately 0.001 inch thick. The base member is clad on the one side thereof with a continuous conductive layer or shield 26 o aluminum which is approximately one micron thick. The opposite side of the base member 24 carries segmented conductive layer 28 thereon which is fabricated from aluminum. The segmented conductive layer constitutes a plurality of control electrodes. A plurality of rows of holes or apertures 20 approximately 0.15 mm in diameter are provided in the layered structure in a pattern suitable for use in recording information. The apertures form an electrode array of individually addressable electrodes. With the shield grounded and zero to +50 volts applied to an addressable electrode, toner is electrostatically attracted through the aperture associated with that electrode. The aperture extends through the base 24 and the conductive layers 26 and 28.

With a negative 300 volts applied to an addressable electrode toner is prevented from being propelled through the aperture. Image intensity can be varied by adjusting the voltage on the control electrodes between 0 and minus 300 volts. Addressing of the individual electrodes can be effected in any well known manner know in the art of printing using electronically addressable printing elements.

The backing electrode or shoe 16 has an arcuate shape as shown but as will be appreciated, the present invention is not limited by such a configuration. The shoe which is positioned on the opposite side of a plain paper recording medium 22 from the printhead deflects the recording medium in order to provide an extended area of contact between the medium and the shoe.

The recording medium 22 may comprise cut sheets of paper fed in the direction of the arrow 30 from a supply tray, not shown. The sheets of paper are spaced from the printhead 14 a distance in the order of 0.003 to 0.030 inch as they pass thereby. The sheets 22 are transported in contact with the shoe 16 via edge transport roll pairs 32.

The combination toner charging and delivery system 12 comprises a generally cylindrical member 34 which may be fabricated from aluminum. The longitudinal axis of the member 34 is coextensive with the width of the recording medium 22 which extends perpendicular to the plane of the Figure. The material from which the member 34 is fabricated insures a triboactive relationship with the toner particles 18. Alternatively, the member 34 may have a material coated on the surface thereof contacted by the toner particles which insures a triboactive relationship with the toner particles 18.

An annular channel 35 is delineated by an inner surface 36 of the member 34 and an outer surface 37 of a crescent-shaped member 38 supported internally of the cylindrically shaped member 34.

A toner bed 39 is fluidized by air flowing into cavity 40 formed between porous member 41 and the adjacent area of crescent-shaped member 38. Air flowing through the toner bed to maintain its fluidized state escapes to the atmosphere through filtered air vent 43. Ports 44 (only one being shown) for the injection air into cavity 40 and air vent 43 are positioned at the ends of the cylindrical structure 34.

Ejector 46 extracts toner from the fluidized bed and drives it through the channel 35. Ejector 46 may be a row of localized nozzles of the type normally used in the powder spraying industry or a specially designed slit shaped nozzle that extends the full length of the cylindrical structure 34. The velocity of the toner laden air flowing through the channel 35 is controlled by the flow resistance of the channel and the nozzle design pressure applied to a tubular air input 45. Through the action of centrifugal force the toner impinges on the triboactive surface 36 thereby becoming charged to the desired polarity and charge level.

To control the q/m of the toner particles to a desired predetermined value, a q/m control electrode 48 is provided on the outer surface 37 of the crescent-shaped member 38. The charged toner particles are transported through the channel 35 and impinge on the surface 36 until the q/m reaches a predetermined level, at which time the electrostatic field produced by the voltage applied to the control elctrode 48 precludes further contact therebetween.

The charged toner particles move clockwise through the channel 35 until they reach an elongated opening 50 in the member 34. At the opening 50, a toner cloud of well charged toner is positioned for electrostatic extraction through certain of apertures of the printhead structure 14, movement of toner particles through the selected apertures being in accordance with the information to be printed on the substrates 22. The positive biasing of the backing electrode or shoe 16 via bias 52 together with the appropriate voltages being applied to the control electrodes of the printhead structure effects propulsion of toner through the appropriate apertures to thereby impinge on the substrate 22 in image configuration.

Unused toner particles are returned to the toner bed 39 via a channel outlet 54. A portion of the air transporting the toner through the channel 35 exits from the member 34 via an outlet 56. An electrically biased screen 58 serves to separate the unused toner particles from that portion of the air exiting from the member 34. The remainder of the air carries the unused toner particles back to the toner bed through the channel outlet 54. A flat scorotron 55 serves to neutralize the charge on the unused toner particles before they are returned to the cavity 44.

At the fusing station, a fuser assembly, indicated generally by the reference numeral 60, permanently affixes the transferred toner powder images to sheet 22. Preferably, fuser assembly 60 includes a heated fuser roller 62 adapted to be pressure engaged with a back-up roller 64 with the toner powder images contacting fuser roller 62. In this manner, the toner powder image is permanently affixed to image receiving substrate 22. After fusing, chute, not shown, guides the advancing sheet 30 to a catch tray (not shown) for removal from the printing machine by the operator.

What is claimed is:

1. The method of forming toner images on an image receiving surface, said method including the steps of:

using centrifugal force, moving uncharged toner particles into friction contact with a triboactive surface to thereby charge said uncharged toner particles;

controlling the level of charging to a predetermined q/m ratio; and effecting movement of charged toner particles to an image receiving surface.

2. The method according to claim 1 wherein said step of moving uncharged toner particles into friction contact with a triboactive surface comprises using air carrying toner particles through an annular channel delineated in part by said triboactive surface.

3. The method according to claim 2 wherein said step of controlling the level of charging comprises creating an electrostatic field across said channel, the magnitude of said field being such that toner particles charged to said predetermined level are precluded from further contact with said triboactive surface.

4. The method according to claim 3 wherein said image receiving surface comprises plain paper.

5. The method according to claim 4 wherein said step of effecting movement of toner particles onto an image receiving surface utilizes an apertured printhead having addressable electrodes for effecting movement of said toner particles to said image receiving surface in image configuration.

6. The method according to claim 5 wherein step of creating an electrostatic field uses a biased electrode carried by another surface partly delineating said annular channel.

7. The method according to claim 6 wherein q/m is represented by the formula:

$$q/m=(V^2/E)/R$$

where q=charge on the toner in microcoulombs m=mass of the toner in grams

V=air velocity through the annular channel in meters/sec.

E=electrostatic field strength across the channel

R=radius of curvature of channel in centimeters.

8. Combination toner charging and delivery apparatus, said apparatus comprising:

means for centrifugally moving uncharged toner particles into contact with a triboactive surface to thereby effect charging of said toner particles;

means for limiting the degree of charging of said toner particles; and means for moving charged toner particles to an image receiving substrate.

9. Apparatus according to claim 8 wherein said means for centrifugally moving uncharged toner particles into contact with a triboactive surface comprises means forming an annular channel through which toner particles are carried by air.

10. Apparatus according to claim 9 wherein said channel is delineated by inner and outer surfaces, the former of which comprises said triboactive surface.

11. Apparatus according to claim 10 wherein said outer surface includes a control electrode and further including means for electrically biasing said control electrode to create an electrostatic field across said channel.

12. Apparatus according to claim 11 wherein the charge to mass ratio of said toner particles is represented by the formula:

$$q/m = V^2(/E)/R$$

where q=charge on the toner in microcoulombs m=mass of the toner in grams

V=air velocity through the annular channel in meters/sec.

E=electrostatic field strength across the channel

R=radius of curvature of channel in centimeters.

13. Apparatus for forming toner images on image receiving substrates, said apparatus comprising:

means for centrifugally moving uncharged toner particles into contact with a triboactive surface to thereby effect charging of said toner particles;

means for limiting the degree of charging of said toner particles; and means for moving charged toner particles to an image receiving substrate.

14. Apparatus according to claim 13 wherein said means for centrifugally moving uncharged toner particles into contact with a triboactive surface comprises means forming an annular channel through which toner particles are carried by air.

15. Apparatus according to claim 14 wherein said channel is delineated by inner and outer surfaces, the former of which comprises said triboactive surface.

16. Apparatus according to claim 15 wherein said outer surface includes a control electrode and further including means for electrically biasing said control electrode to create an electrostatic field across said channel.

17. Apparatus according to claim 16 wherein the charge to mass ratio of said toner particles is represented by the formula:

$$q/m = V^2(/E)/R$$

where q=charge on the toner in microcoulombs m=mass of the toner in grams

V=air velocity through the annular channel in meters/sec.

E=electrostatic field strength across the channel

R=radius of curvature of channel in centimeters.

18. Apparatus according to claim 17 wherein said image receiving substrate comprises plain paper.

19. Apparatus according to claim 13 wherein said means for moving charged toner particles to said image receiving substrate comprises an apertured printhead structure having electronically addressable electrodes for selectively controlling the flow of toner particles through said apertures in said printhead structure whereby toner particles are delivered to said plain paper in image configuration.

20. Apparatus according to claim 19 including an electrically biased backing electrode and means for moving said image receiving substrates thereacross.

* * * * *